United States Patent
Gurovich et al.

(10) Patent No.: US 12,345,735 B2
(45) Date of Patent: Jul. 1, 2025

(54) SYSTEM AND METHOD FOR DETERMINING A RELATIVE MOTION BETWEEN TWO OR MORE OBJECTS

(71) Applicant: ELBIT SYSTEMS LTD., Haifa (IL)

(72) Inventors: Evgeni Gurovich, Haifa (IL); Yoav Ophir, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 311 days.

(21) Appl. No.: 17/942,697

(22) Filed: Sep. 12, 2022

(65) Prior Publication Data

US 2023/0003757 A1    Jan. 5, 2023

Related U.S. Application Data

(63) Continuation of application No. PCT/IL2021/050243, filed on Mar. 4, 2021.

(30) Foreign Application Priority Data

Mar. 12, 2020 (IL) ............................................ 273288

(51) Int. Cl.
  *G01P 3/68* (2006.01)
  *G01S 11/12* (2006.01)

(52) U.S. Cl.
  CPC ................ *G01P 3/68* (2013.01); *G01S 11/12* (2013.01)

(58) Field of Classification Search
  CPC ............ G01P 3/68; G01S 11/12; G01S 17/87; G01S 11/00; G06T 7/254; H04N 7/183

(Continued)

(56) References Cited

U.S. PATENT DOCUMENTS

| 4,495,589 A | 1/1985 | Hirzel |
| 5,748,318 A | 5/1998 | Maris |

(Continued)

FOREIGN PATENT DOCUMENTS

| WO | WO-98/02735 A1 | 1/1998 |
| WO | WO-2011/002227 | 1/2011 |
| WO | WO-2017/119557 A1 | 7/2017 |

OTHER PUBLICATIONS

Fisher et al.; Precision Position, Navigation and Timing without the Global Positioning System, Air & Space Power Journal, pp. 24-33, Summer 2011.

(Continued)

*Primary Examiner* — Isiaka O Akanbi
(74) *Attorney, Agent, or Firm* — PEARL COHEN ZEDEK LATZER BARATZ LLP

(57) ABSTRACT

Systems and methods for determining a relative motion between two or more objects are disclosed. The system may include an excitation unit adapted to be disposed on a first object and configured to excite and to induce at least one change in at least a portion of a second object. The system may include a sensing unit adapted to be disposed on the first object, the sensing unit may include at least one sensor configured to detect the at least one change in the second object at two or more different time instances and to generate corresponding two or more sensor output datasets. The system may include a processing unit configured to determine a relative motion between the first object and the second object based on the two or more sensor output datasets thereof.

17 Claims, 10 Drawing Sheets

(58) Field of Classification Search
USPC .................................................. 356/614–624
See application file for complete search history.

(56) References Cited

U.S. PATENT DOCUMENTS

| | | | |
|---|---|---|---|
| 6,118,132 A | 9/2000 | Tullis | |
| 2004/0233460 A1* | 11/2004 | Ura | G01S 17/87 356/601 |
| 2007/0002304 A1* | 1/2007 | Saltsman | G01S 5/16 356/622 |
| 2009/0190120 A1* | 7/2009 | Wustefeld | G01P 21/02 356/27 |
| 2010/0225931 A1 | 9/2010 | Jokinen | |
| 2011/0051120 A1* | 3/2011 | Hartman | G01S 17/86 356/5.01 |
| 2013/0162778 A1 | 6/2013 | Kurokawa | |
| 2013/0321826 A1* | 12/2013 | Chen | G01S 17/08 356/614 |
| 2014/0247351 A1 | 9/2014 | Murillo Amaya | |
| 2016/0025502 A1 | 1/2016 | Lacaze | |
| 2018/0259341 A1 | 9/2018 | Aboutalib | |
| 2020/0348765 A1* | 11/2020 | Gurovich | G06F 1/1698 |
| 2021/0141232 A1* | 5/2021 | Ophir | G06F 3/038 |
| 2023/0003550 A1* | 1/2023 | Gurovich | G01R 33/02 |

OTHER PUBLICATIONS

International Search Report for PCT Application No. PCT/IL2021/050243, mailed Jul. 1, 2021.
Kathryn Bailey; "New navigation tech keeps Soldiers without GPS on track", the United States Army, Cerdec CP&I Public Affairs, Jul. 6, 2016; https://www.army.mil/article/170562/new_navigation_tech_keeps_soldiers_withouy_gps_on_track.
Office action for Israel Patent Application No. 273288, mailed Nov. 11, 2020.
Office action for Israel Patent Application No. 273288, mailed Nov. 3, 2021.
Paulo V K Borges et al.; "Practical Infrared Visual Odometry", IEEE Transactions on Intelligent Transportation Systems, vol. 17, Issue: 8, pp. 1-10, Aug. 2016.
Rumiche F. et al. "Anodized aluminium oxide (AAO) nanowell sensors for hydrogen detection", Sensors and Actuators: Chemical Selsevier BV, NL, vol. 134, No. 2, Sep. 25, 2008, pp. 869-877.

* cited by examiner

SYSTEM AND METHOD FOR DETERMINING A RELATIVE MOTION BETWEEN TWO OR MORE OBJECTS

CROSS REFERENCE TO RELATED APPLICATIONS

This Application is a continuation of PCT Application No. PCT/IL2021/050243 filed on Mar. 4, 2021, claiming priority from Israeli Patent Application No. 273288 filed on Mar. 12, 2020, all of which are incorporated herein by reference in their entirety.

FIELD OF THE INVENTION

The present invention relates to the field of determining a relative motion between objects, and more particularly, to remote determining thereof.

BACKGROUND OF THE INVENTION

Current systems and methods for determining a relative motion between objects typically track visual markers on the objects (e.g., such as shape and/or color of the object) or utilize Doppler effect. Such systems and methods may fail to determine a relative motion between objects when the objects lack the visual markers and/or when the objects have uniform structure. Furthermore, some of such systems and methods (e.g., radar-like detectors of relative motion) may be sensitive to, for example, geometry of objects, physical properties of object's surface, etc.

SUMMARY OF THE INVENTION

Some embodiments of the present invention may provide a system for determining a relative motion between two or more objects, the system may include: an excitation unit adapted to be disposed on a first object, the excitation unit is configured to excite and to induce at least one change in at least a portion of a second object; a sensing unit adapted to be disposed on the first object, the sensing unit may include at least one sensor configured to detect the at least one change in the second object at two or more different time instances and to generate corresponding two or more sensor output datasets; and a processing unit in communication with the sensing unit, the processing unit is configured to determine a relative motion between the first object and the second object based on the two or more sensor output datasets.

In some embodiments, the processing unit is configured to quantify the relative motion between the first object and the second object based on the two or more sensor output datasets thereof.

In some embodiments, the at least one change is at least one of: a physical change, a chemical change or a combination thereof.

In some embodiments, the at least one change is temporal and wherein the second object reverts to its initial state prior to excitation after a period of time.

In some embodiments, the processing unit is configured to determine a period of time after which a magnitude of the at least one temporal change reduces below a predefined threshold based on at least one of: a type of the at least one temporal change, one or more surface parameters of the second object and environmental conditions.

In some embodiments, the excitation unit is configured to set a magnitude of the excitation to adjust the period of time to a desired value.

In some embodiments, the excitation unit is configured to induce at least one pattern of changes, wherein the at least one pattern of changes may include multiple spots, each of the multiple spots may include the at least one change.

In some embodiments, the processing unit is configured to detect, based on at least one of the two or more sensor output datasets, an upcoming disappearance of the at least one change from a field-of-view (FOV) of the at least one sensor.

In some embodiments, the disappearance of the at least one change from the FOV of the at least one sensor is due to at least one of: temporarily nature of the at least one change, relative motion between the first object and the second object and at least partial eclipse of the FOV by a third object.

In some embodiments, upon the detection of the upcoming disappearance of the at least one change from the FOV of the at least one sensor, the processing unit is configured to control the excitation unit to excite at least a portion of the second object before the at least one change disappears from the FOV of the at least one sensor.

In some embodiments, the processing unit is configured to control the excitation unit to excite at least one of: the same portion of the second object that has been excited at a preceding excitation cycle; and a second portion of the second object such that previously excited portion of the second object and the second portion thereof are both in the FOV of the at least one sensor during at least one time point.

In some embodiments, the excitation unit is configured to induce, during at least one of excitation cycles, the at least one change that is different from the at least one change induced during other excitation cycles.

In some embodiments, the excitation unit is configured to encode a supplementary information in the at least one change.

In some embodiments, the system may include at least one distance sensor adapted to be disposed on at least one of the first object and the second object, the at least one distance sensor is configured to measure a distance between the first object and the second object.

In some embodiments, the processing unit is configured to determine at least one of: determine a real-world geographical location of the first object based on a real-world geographical location of the second object, the determined relative motion between the first object and the second object, the measured distance between the first object and the second object and a known real-world geographical location of the first object at some time instance during the tracking process; and determine a real-world geographical location of the second object based on a real-world geographical location of the first object, the determined relative motion between the first object, the second object and the measured distance between the first object and the second object and a known real-world geographical location of the second object at some time instance during the tracking process.

Some embodiments of the present invention may provide a method of determining a relative motion between two or more objects, the method may include: exciting, by an excitation unit disposed on a first object, at least a portion of a second object to induce at least one change therein; detecting, by at least one sensor of a sensing unit disposed on the first object, the at least one change in the second object at two or more different time instances; generating, by the at least one sensor, corresponding two or more sensor output datasets; and determining, by a processing unit, a relative motion between the first object and the second object based on the two or more sensor output datasets.

Some embodiments may include quantifying, by the processing unit, the relative motion between the first object and the second object based on the two or more sensor output datasets thereof.

Some embodiments may include inducing, by the excitation unit, at least one of: a physical change, a chemical change or a combination thereof, in the second object.

Some embodiments may include inducing, by the excitation unit, at least one temporal change in the second object such that the second body reverts to its initial state prior to excitation after a period of time.

Some embodiments may include determining, by the processing unit, a period of time after which a magnitude of the at least one temporal change reduces below a predefined threshold based on at least one of: a type of the at least one temporal change, one or more surface parameters of the second object and environmental conditions.

Some embodiments may include setting, by the excitation unit, a magnitude of the excitation to adjust the period of time to a desired value.

Some embodiments may include inducing, by the excitation unit, at least one pattern of changes, wherein the at least one pattern of changes may include multiple spots, each of the multiple spots may include the at least one change.

Some embodiments may include detecting, by the processing unit, based on at least one of the two or more sensor output datasets, an upcoming disappearance of the at least one change from a field-of-view (FOV) of the at least one sensor of the sensing unit.

In some embodiments, the disappearance of the at least one change from the FOV of the at least one sensor is due to at least one of: temporarily nature of the at least one change, relative motion between the first object and the second object and at least partial eclipse of the FOV by a third object.

Some embodiments may include, upon the detection of the upcoming disappearance of the at least one change from the FOV of the at least one sensor, exciting, by the excitation unit, at least a portion of the second object before the at least one change disappears from the FOV of the at least one sensor.

Some embodiments may include exciting, by the excitation unit, at least one of: the same portion of the second object that has been excited at a preceding excitation cycle; and a second portion of the second object such that the previously excited portion of the second object and the second portion of the second object are both in the FOV of the at least one sensor during at least one time point.

Some embodiments may include inducing, by the excitation unit, during at least one of excitation cycles, the at least one change that is different from the at least one change induced during other excitation cycles.

Some embodiments may include encoding, by the excitation unit, a supplementary information in the at least one change.

Some embodiments may include measuring a distance between the first object and the second object by at least one distance sensor disposed on at least one of the first object and the second object.

Some embodiments may include determining at least one of: determining, by the processing unit, a real-world geographical location of the first object based on a real-world geographical location of the second object, the determined relative motion between the first object and the second object, the measured distance between the first object and the second object and a known real-world geographical location of the first object at some time instance during the tracking process; and determining, by the processing unit, a real-world geographical location of the second object based on a real-world geographical location of the first object, the determined relative motion between the first object and the second object, the measured distance between the first object and the second object and a known real-world geographical location of the second object at some time instance during the tracking process.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
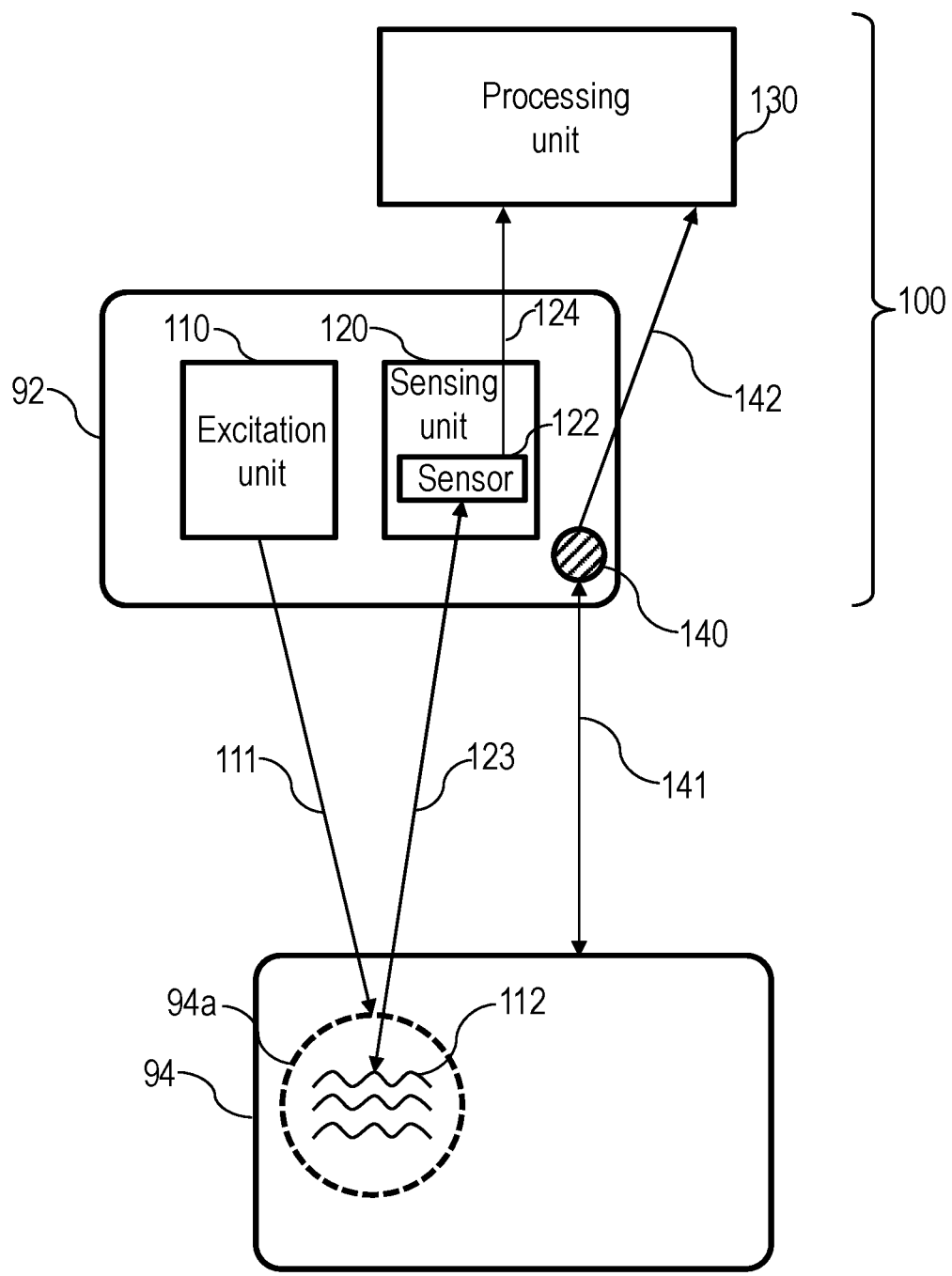
FIGS. 1A and 1B are schematic block diagrams of a system for determining a relative motion between two or more objects, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, systems and methods for determining and/or quantifying a relative motion between two or more objects (e.g., between at least a first object and at least a second object) or between one or more objects and a specified location, are disclosed.

According to some embodiments, the system may include an excitation unit, a sensing unit and a processing unit. The excitation unit and/or the sensing unit may be adapted to be disposed on, for example, a first object. The excitation unit may excite at least a portion of a second object and to induce at least one change therein. In some embodiments, the at least one change may be one of: a physical change, a chemical change or a combination thereof. In some embodiments, the at least one change is temporal, and the second body reverts to its initial state after a predetermined period of time.

The sensing unit may detect the at least one change thereof at two or more different time instances (e.g., time points) and to generate corresponding two or more sensor output datasets.

The processing unit may determine, and in some embodiments to quantify, a relative motion between, for example, the first object and the second object based on the two or more sensor output datasets thereof.

According to some embodiments, the excitation unit and the sensing unit may be adapted to be disposed at, for example, a specified location in a terrain and the processing unit is configured to determine the relative motion of one or more objects with respect to the specified location thereof.

Advantageously, the disclosed systems and methods may enable determination and/or quantification of the relative motion between two or more objects, and/or the relative motion between one or more objects and the specified location, for example in the case when the objects lack any (or sufficient number of) visual markers and/or have uniform structure. Furthermore, the determination and/or quantification of the relative motion thereof may be performed, in some embodiments, without inducing long-term changes (such as, for example, permanent visual markers or continuous electromagnetic radiation) in the objects.

Figure 1B:
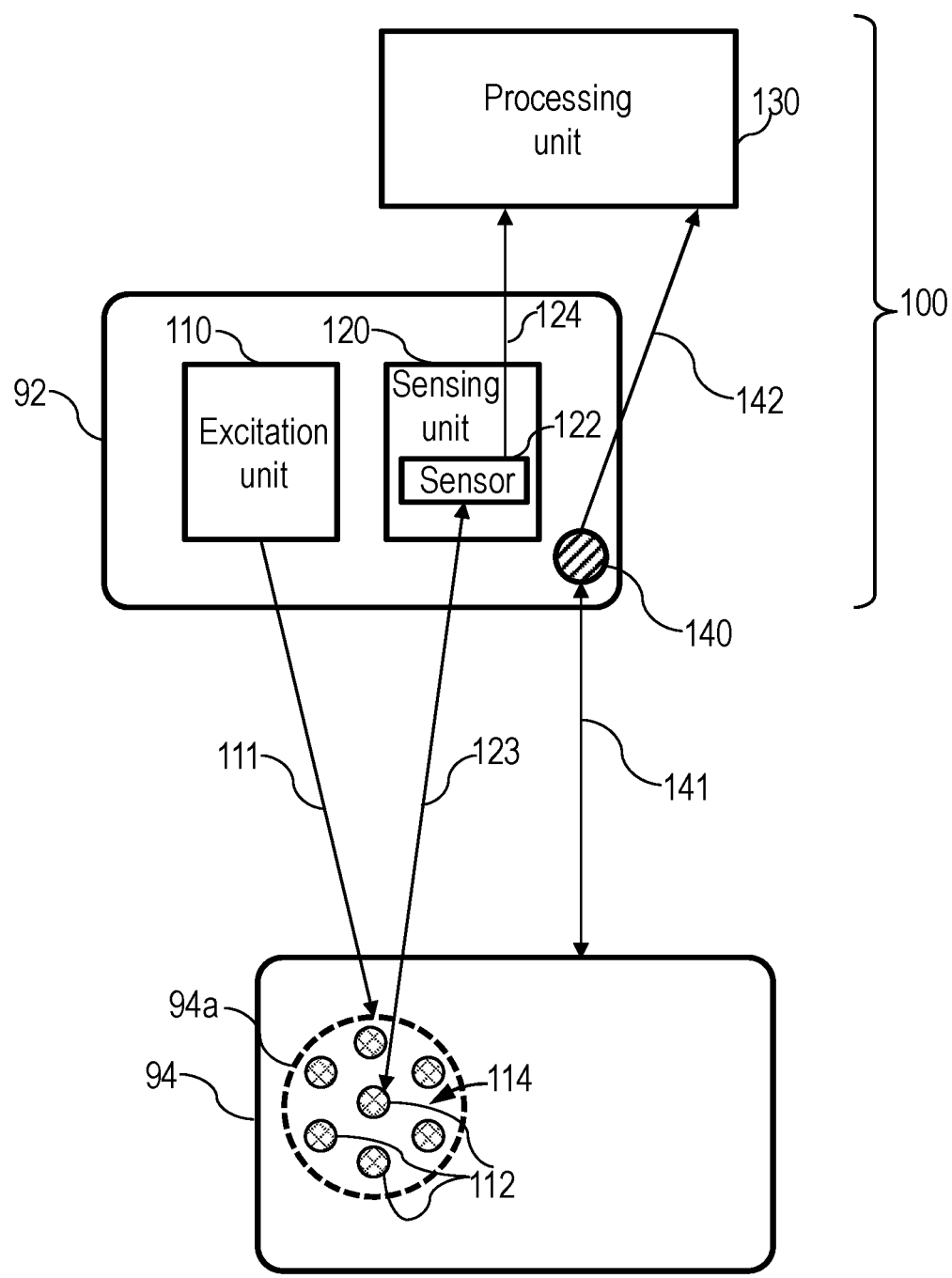

Reference is now made to FIGS. 1A and 1B, which are schematic block diagrams of a system 100 for determining a relative motion between two or more objects, according to some embodiments of the invention.

According to some embodiments, system 100 may include an excitation unit 110, a sensing unit 120 and a processing unit 130 (e.g., as shown in FIGS. 1A and 1B). System 100 may determine and/or quantify a relative motion between, for example, two or more objects. For example, system 100 may determine and/or quantify a relative motion between a first object 92 and a second object 94, as described below with respect to FIGS. 1A and 1B.

The two or more objects (e.g., first object 92 and/or second object 94) may, for example, be vehicles, planes, humans, terrains, etc. For example, first object 92 may be a human or a vehicle and second object 94 may be a homogeneous (or substantially homogeneous) part of a terrain (e.g., a road or a wall) that has no distinguishing visible features. In this example, first object 92 (e.g., human/vehicle) may move through/along second object 94 (e.g., part of the terrain) and the relative motion therebetween may be determined and/or quantified by system 100.

According to some embodiments, excitation unit 110 may be adapted to be disposed on, for example, first object 92. Excitation unit 110 may excite at least a portion 94a of second object 94 (e.g., as indicated by arrow 111 in FIGS. 1A and 1B). Excitation 111 by excitation unit 110 may induce at least one change 112 at least in portion 94a of second object 94.

Change(s) 112 induced by excitation unit 110 in second object 94 may be physical change(s), chemical change(s) or a combination thereof.

The physical change(s) (e.g., change(s) 112) may, for example, include a change of a temperature of second body 94 at least within portion 94b thereof as compared to a temperature prior to excitation 111.

In another example, the physical change(s) may include a change of a density of second body 94 at least within portion 94b thereof as compared to a density prior to excitation 111.

In another example, the physical change(s) may include a change of a permeability of second body 94 at least within portion 94b thereof as compared to a permeability prior to excitation 111.

In another example, the physical change(s) may include an ionization of second body 94 at least in portion 94a thereof.

In another example, the physical change(s) may include an excitation of electrons' energy levels of second body 94 at least within portion 94a thereof.

In another example, the physical change(s) may include a change of a color of second body 94 at least within portion 94b thereof as compared to a color prior to excitation 111.

In another example, the physical change(s) may include a radiation of light at least from portion 94b of second object 94.

The chemical change(s) (e.g., change(s) 112) may, for example, include a change of a chemical composition of second body 94 at least within portion 94 thereof.

In various embodiments, excitation unit 110 may be an optical excitation unit. In this case, excitation unit 110 may illuminate second object 94 with at least one excitation light beam that may be a collimated light beam or a coherent laser beam. In some other embodiments, excitation unit 110 may be an acoustic excitation unit or a radiofrequency excitation unit.

In some embodiments, excitation unit 110 may excite 111 two or more different portions 94a on second object 94 to thereby induce corresponding two or more changes 112 within two or more portions 94a thereof. Excitations 111 of two or more different portions 94a of second object 94 may be performed simultaneously or subsequently. In some embodiments, system 100 may include two or more excitation units 110 each configured to excite different portion 94a of second object 94.

In some embodiments, change(s) 112 induced by excitation unit 110 may be temporal, such that second body 94 reverts to its initial state (e.g., state prior to excitation 111) after a period of time. The period of time may, for example, depend on the type of change(s) 112, surface parameters of second object 94 (e.g., type of surface, whether the surface produces/removes heat, tec.) and environmental conditions (e.g., ambient temperature, etc.). The predetermined period of time may, for example, range between few seconds to few minutes.

In some embodiments, processing unit 130 may determine a period of time after which a magnitude of temporal change(s) 112 reduces below a predefined threshold based on at least one of: a type of change(s) 112, surface parameter(s) of second object 94 and environmental conditions. In some embodiments, excitation unit 110 may set a magnitude of excitation 111 to adjust the period of time to a desired value.

According to some embodiments, sensing unit 120 may be adapted to be disposed on, for example, first object 92. Sensing unit 120 may include at least one sensor 122. Sensor(s) 122 may detect change(s) 112 in second object 94 at two or more different time instances (e.g., as indicated by doubled arrow 123 in FIGS. 1A and 1B). Sensor(s) 122 may generate corresponding two or more sensor output datasets 124 based on the detected change(s) 112. For example, each of two or more sensor output datasets 124 may correspond to one of the two or more different time instances. Sensor output datasets 124 may, for example, include sensor output data values representing change(s) 112 in second object 94.

In some embodiments, sensor(s) 122 may be optical sensor(s). The optical sensor(s) may, for example, be radioactive sensor(s), thermal sensor(s), etc. For example, when sensor(s) 122 is/are optical sensor(s), sensor output datasets 124 may include images of second object 94 (or of at least portion 94a thereof).

In various embodiments, sensing unit 120 and/or sensor(s) 122 may be stationary or gimbaled. Processing unit 130 may track a relative position and orientation of sensing unit 120 and/or sensors 122 with respect to excitation unit 110 such that the relative position therebetween may be known at all times. In various embodiments, processing unit 130 may account for the tracked relative position and orientation of sensor(s) sensing unit 120 and/or sensors 122 and excitation unit 110 when determining and/or quantifying the relative motion between first object 92 and second object 94.

According to some embodiments, processing unit 130 may receive sensor output datasets 124 from sensing unit 120 (e.g., as shown in FIGS. 1A and 1B). Processing unit 130 may determine the relative motion between first object 92 and second object 94 based on sensor output datasets 124.

In some embodiments, processing unit 130 may quantify the relative motion between first object 92 and second object 94 based on sensor output datasets 124. The quantification of the relative motion between first object 92 and second object 94 may, for example, include calculation of a relative velocity, a relative acceleration and/or a relative motion vector (e.g., position and direction of motion) between first object 92 and second object 94.

One example of determining and/or quantifying the relative motion between two or more objects is described below with respect to FIG. 1F.

According to some embodiments, system 100 may include at least one distance sensor 140. Distance sensor(s) 140 may be disposed on, for example, first object 92 and/or on second object 94 (e.g., as shown in FIGS. 1A and 1B). Distance sensor(s) 94 may measure a distance between first object 92 and second object 94 (e.g., as indicated by doubled arrow 141 in FIGS. 1A and 1B) and transmit data concerning the distance thereof to processing unit 130 (e.g., as indicated by arrow 142 in FIGS. 1A and 1B).

In some embodiments, processing unit 130 may determine a real-world geographical location of first object 92 based on a real-world geographical location of second object 94, the determined relative motion between first object 92 and second object 94, the measured distance between first object 92 and second object 94 and a known real-world geographical location of first object 92 at some time instance during the tracking process. In these embodiments, the real-world geographical location of second object 94 may be known or determined (e.g., using a geolocation sensor, such as a GPS sensor, disposed thereon).

In some other embodiments, processing unit 130 may determine a real-world geographical location of second object 94 based on a real-world geographical location of first object 92, the determined relative motion between first object 92 and second object 94, the measured distance between first object 92 and second object 94 and a known real-world geographical location of second object 94 at some time instance during the tracking process. In these embodiments, the real-world geographical location of first object 92 may be known or determined (e.g., using a geolocation sensor, such as a GPS sensor, disposed thereon).

According to some embodiments, excitation unit 110 may induce one or more patterns 114 of changes 112 in second object 94 (e.g., as shown in FIG. 1B). Each of patterns 114 of changes 112 may include multiple spots of changes 112. The spots may have any shape (e.g., points, lines, markers, figures, etc.) and dimensions. Sensing unit 120 may detect pattern(s) 114 of changes 112 at two or more different time instances to thereby generate corresponding two or more sensor output datasets 124 based on the detected pattern(s) 114 of changes 112. Processing unit 130 determine and/or quantify relative motion between first object 92 and second object 94 based on the sensor output datasets.

For example, excitation unit 110 may induce a pattern of thermal changes in second object 94. In this example, sensing unit 120 may generate two or more thermal images of the pattern of changes (e.g., two or more sensor output datasets 124) based on the detected pattern of thermal changes. Yet in this example, processing unit 130 may compare the two or more thermal images of the detected patterns of changes and determine the relative motion between first object 92 and second object 94 based on the comparison thereof. In some embodiments, processing unit 130 may quantify the relative motion between first object 92 and second object 94 based on the spots of the detected patterns (e.g., using triangulation techniques). In some embodiments, sensing unit 120 may include two or more sensors 122 and processing unit 130 may be configured to quantify the relative motion between first object 92 and second object 94 based on outputs from the two or more sensors 122 (e.g., using triangulation techniques).

Figure 1C:
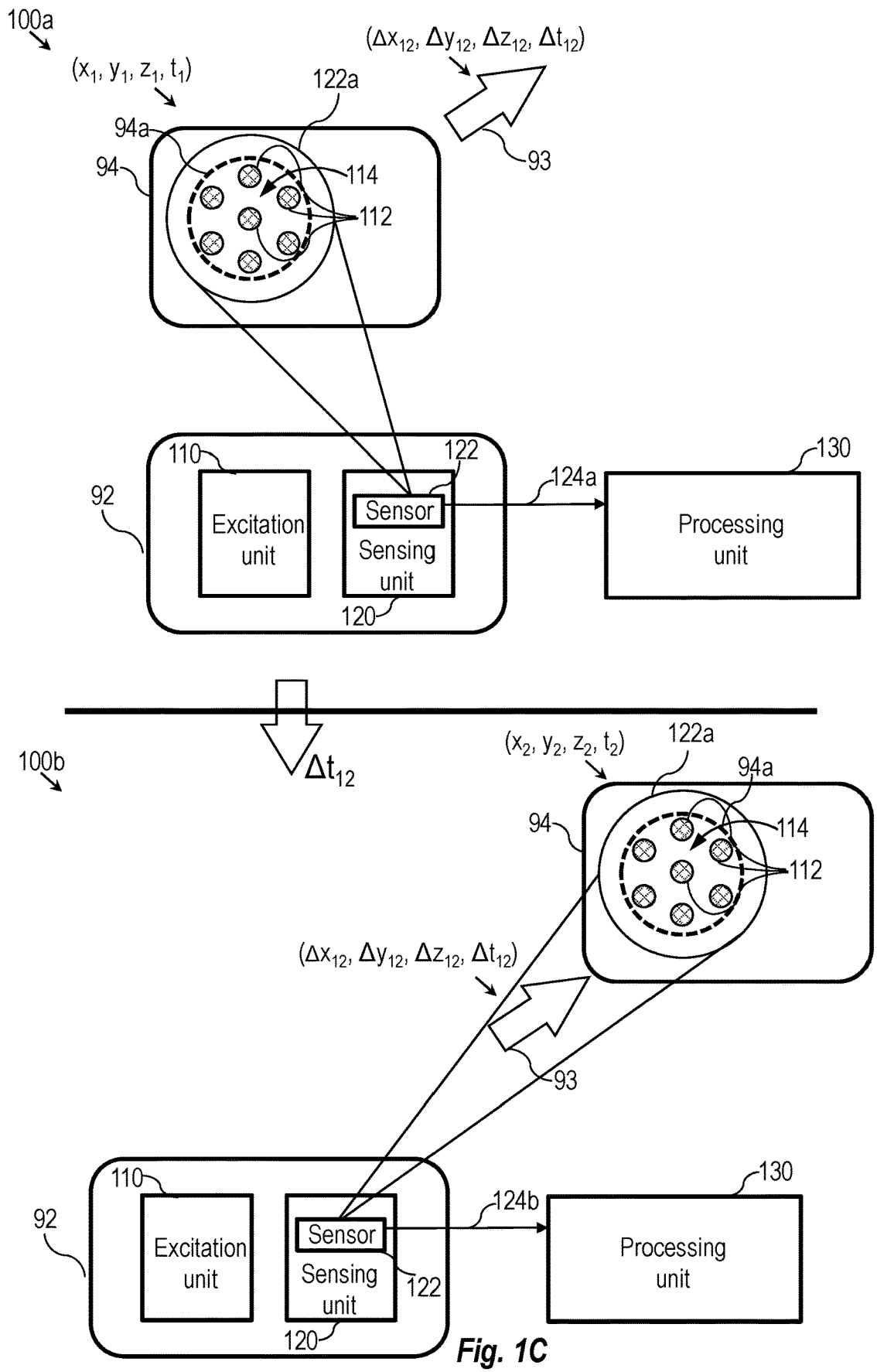
FIG. 1C is a schematic illustration of an example of determining a relative motion between at least a first object and at least a second object by a system for determining a relative motion between two or more object, according to some embodiments of the invention.

Reference is now made to FIG. 1C, which is a schematic illustration of an example of determining a relative motion between at least a first object 92 and at least a second object 94 by a system 100 for determining a relative motion between two or more object, according to some embodiments of the invention.

In example schematically illustrated in FIG. 1C, second object 94 is disposed at a first position $(x_1, y_1, z_1)$ relative to first object 92 at a first time point $t_1$ (e.g., as shown in illustration 100a in FIG. 1C). Yet in these examples, during a time interval $\Delta t_{12}$, second object 94 may move (e.g., as indicated by arrow 93 in FIG. 1C) with respect to first object 92 by $(\Delta x_{12}, \Delta y_{12}, \Delta z_{12})$ such that at a second time point $t_2$ (e.g., where $t_2=t_1+\Delta t_{12}$) second object 94 may be disposed at a second position $(x_2, y_2, z_2)$ relative to first object 92 (e.g., where $x_2=x_1+\Delta x_{12}$, $y_2=y_1+\Delta y_{12}$ and $z_2=z_1+\Delta z_{12}$) (e.g., as shown in illustration 100b in FIG. 1C).

Excitation unit 110 may excite at least portion 94a of second object 94 at a zero-time point $t_0$ (e.g., wherein $t_0<t_1$) such that at first time point $t_1$ change(s) 112 or pattern(s) 114 of changes 112 (e.g., as shown in illustration 100a in FIG. 1C) may be detectable by sensor(s) 122. Sensor(s) 122 may detect change(s) 112 or pattern(s) 114 of changes 112 at first time point $t_1$ (e.g., when second object 94 is at first position $(x_1, y_1, z_1)$) and generate a first sensor output dataset 124a (e.g., as shown in illustration 100a in FIG. 1C). Sensor(s) 122 may detect change(s) 112 or pattern(s) 114 of changes 112 at second time point $t_2$ (e.g., when second object 94 is at second position $(x_2, y_2, z_2)$) and generate a second sensor output dataset 124b (e.g., as shown in illustration 100b in FIG. 1C).

Processing unit 130 may determine relative motion 93 between first object 92 and second object 94, based on first sensor output dataset 124a and second sensor output dataset 124b (e.g., as described above with respect to FIGS. 1A and 1B). In some embodiments, processing unit 130 may quantify relative motion 93 between first object 92 and second object 94, based on first sensor output dataset 124a and second sensor output dataset 124b (e.g., as described above with respect to FIGS. 1A and 1B).

In some embodiments, processing unit 130 may control sensor(s) 122 to follow second object 94 (e.g., according to the determined and/or quantified relative motion between first object 92 and second object 94) such that a field-of-view (FOV) 122a of sensor(s) 122 follows excited portion 94a of second object 94 with change(s) 112 or pattern(s) 114 of changes 112 induced therein (e.g., as shown in FIG. 1C).

Figure 1D:
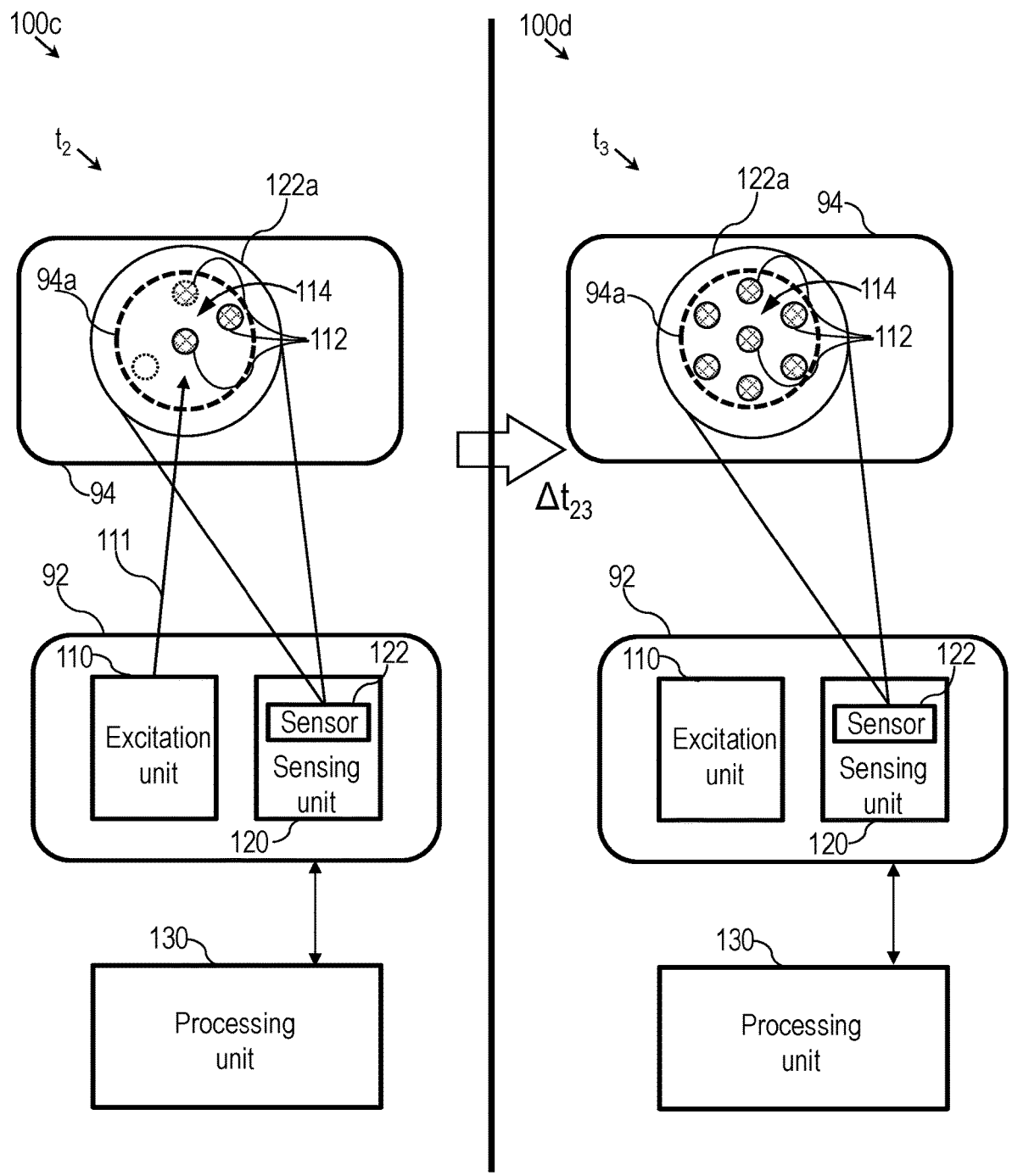
FIGS. 1D and 1E are schematic illustrations of a system for determining a relative motion between two or more object and capable of detecting an upcoming disappearance of at least one change or at least one pattern of changes from a field-of-view of a sensor of a sensing unit of the system, according to some embodiments of the invention.
Figure 1E:
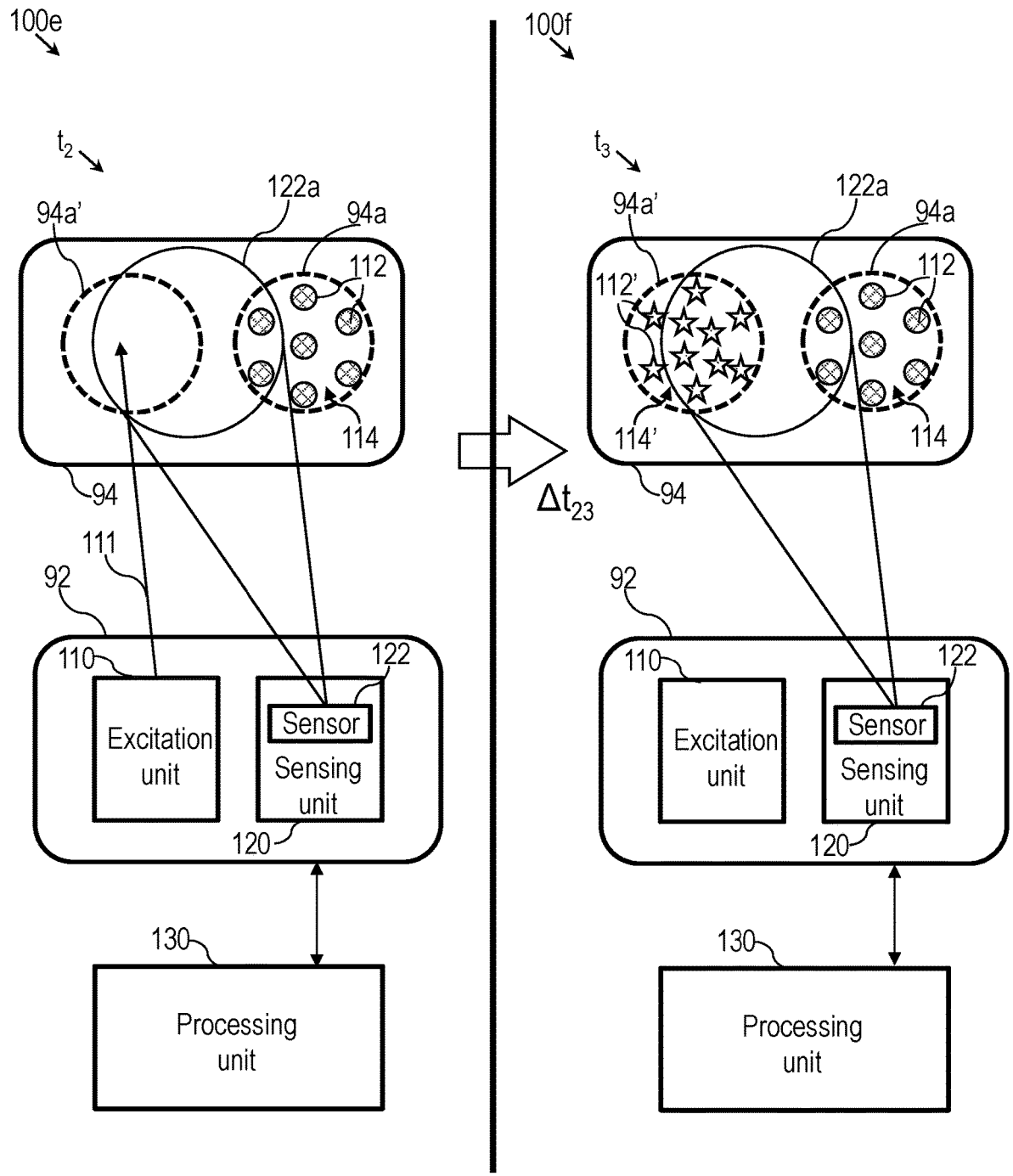

Reference is now made to FIGS. 1D and 1E, which are schematic illustrations of a system 100 for determining a relative motion between two or more object and capable of detecting an upcoming disappearance of at least one change 112 or at least one pattern 114 of changes 112 from a field-of-view 122a of a sensor 122 of a sensing unit 120 of system 100, according to some embodiments of the invention.

Illustrations 100c, 100d and illustrations 100e, 100f in FIGS. 1D, 1E, respectively, depict system 100 at second time point $t_2$ (e.g., as described above with respect to FIG. 1C) and a third time point $t_3$ (e.g., wherein $t_3>t_2$), respectively. At third time point $t_3$, second object 94 may be in second position $(x_2, y_2, z_2)$ (e.g., as described above with respect to FIG. 1C) or at a position that is different from the second position $(x_2, y_2, z_2)$.

According to some embodiments, processing unit 130 may detect an upcoming disappearance of change(s) 112 or pattern(s) 114 of changes 112 from FOV 122a of sensor 122 of sensing unit 120. The upcoming disappearance of change(s) 112 or pattern(s) 114 of changes 112 from FOV 122a may be detected based on at least one of sensor output datasets 124.

For example, the disappearance of change(s) 112 or pattern(s) 114 of changes 112 from FOV 122a of sensor 122 may be due to a temporarily nature of change(s) 112 (e.g., as shown in FIG. 1D and as discussed above with respect to FIGS. 1A and 1B). In another example, the disappearance of change(s) 112 or pattern(s) 114 of changes 112 from FOV 122a of sensor 122 may be due to the relative motion between first object 92 and second object 94 (e.g., as shown in FIG. 1E). In another example, the disappearance of change(s) 112 or pattern(s) 114 of changes 112 from FOV 122a of sensor 122 may be due to at least a partial eclipse of FOV 122a by a third object.

Upon detection of the upcoming disappearance of change(s) 112 or pattern(s) 114 of changes 112 from FOV 122a of sensor 122, processing unit 130 may control excitation unit 110 to excite 111 at least a portion of second object 94 before change(s) 112 or pattern(s) 114 of changes 112 disappear from FOV 122a of sensor(s) 122 (e.g., as shown in FIGS. 1D and 1E). In this manner, continuous tracking of the relative motion between first object 92 and second object 94 may be performed.

In some embodiments, upon the detection thereof, processing unit 130 may control excitation unit 110 to excite 111 the same portion 94a of second object 94 that has been excited at a preceding excitation cycle (e.g., as shown in FIG. 1D).

In some embodiments, upon the detection thereof, processing unit 130 may control excitation unit 110 to excite 111 a second portion 94a' on second object 94 (e.g., as shown in FIG. 1E). In some embodiments, previously excited portion 94a and excited second portion 94a' may be both in FOV 122a of sensor 122 during at least one time point (e.g., third time point $t_3$ as shown in FIG. 1E).

In various embodiments, processing unit 130 may control excitation unit 110 to induce different change(s) 112 or different patterns 114 of changes 112 during at least some of excitation cycles. For example, upon the detection of the upcoming disappearance of pattern 114 of changes 112 from FOV 122a of sensor 122, processing unit 130 may control excitation unit 110 to induce a second pattern 114' of second changes 112' that is different from pattern 114 of changes 112 induced during a preceding excitation cycle (e.g., as shown in FIG. 1E). In this manner, interference between different changes 112, 112' or different patterns 114, 114' of changes 112, 112' may be avoided.

In various embodiments, change(s) 112 or pattern(s) 114 of change(s) 112 may encode a supplementary information. For example, different change(s) 112 and/or different patterns 114 of changes 112 may encode different supplementary information. The supplementary information may, for example, include a time stamp representing a time at which the excitation that caused this particular change(s) 112 or pattern(s) 114 of changes 112 has occurred. In another example, the supplementary information may include a system identification. In this manner, multiple systems (like system 100) may operate simultaneously without interfering with each other.

In various embodiments, processing unit 130 may control excitation unit 110 to apply excitation cycles based on the determined and/or quantified relative motion between first object 92 and second object 94, such that one or more of changes 112 in second object 94 may be detectable by sensing unit 120 at all times. For example, a frequency of the excitation cycles may be based on the determined relative velocity between first object 92 and second object 94.

Figure 1F:
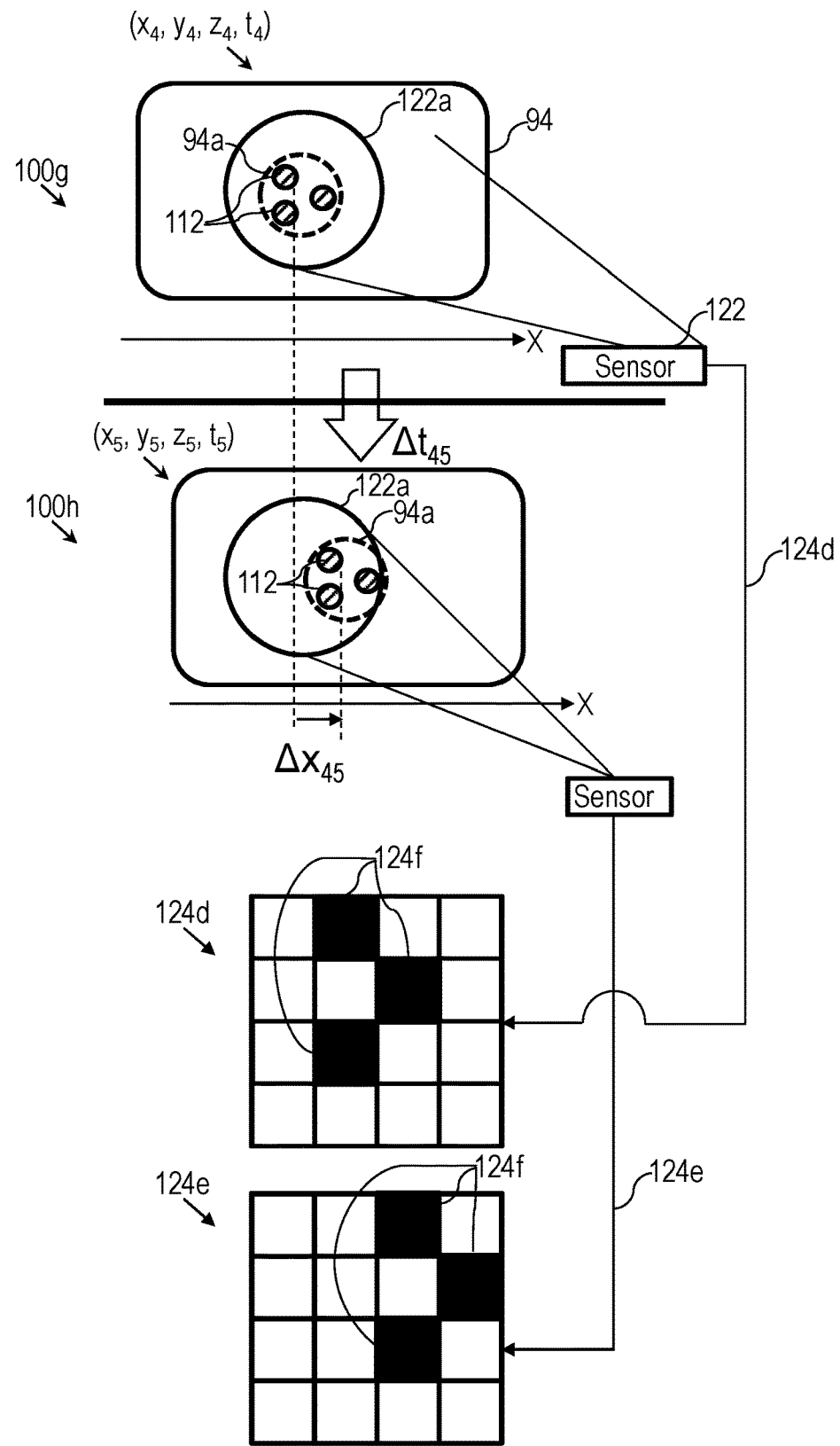
FIG. 1F depicts an example of determining a relative motion between two or more objects based on image frames obtained by sensor(s) of a sensing unit of a system 100 for determining a relative motion between two or more object, according to some embodiments of the invention.

Reference is now made to FIG. 1F, which depicts an example of determining a relative motion between two or more objects based on image frames obtained by sensor(s) 122 of a sensing unit 120 of a system 100 for determining a relative motion between two or more object, according to some embodiments of the invention.

It is noted that first object 92, excitation unit 110, sensing unit 120 and processing unit 130 are not shown in FIG. 1F for sake of clarity only.

Illustrations 100g and 100h in FIG. 1F depict second object 94 at a fourth time point $t_4$ and a fifth time point $t_5$ (e.g., wherein $t_5 > t_4$), respectively. At fourth time point $t_4$, second object is at a fourth position ($x_4$, $y_4$, $z_4$). During a time interval $\Delta t_{45}$, second object 94 may move by a distance $\Delta x_{45}$ along an arbitrary X axis such that at fifth time point $t_5$ second object 94 is at a fifth position ($x_5 = x_4 + \Delta x_{45}$, $y_5$, $z_5$).

Sensor(s) 122 may capture two subsequent image frames 124d, 124e (e.g., sensor datasets) of FOV 122a thereof when second object 94 at fourth time point $t_4$ and fifth time point $t_5$, respectively (corresponding to fourth position and fifth position, respectively). Pixels 124f in image frames 124d, 124e may represent changes 112 in portion 94a on second object 94. A shift of pixels 124f in image frames 124d, 124e may correspond to actual motion of second object 94 with respect to sensor(s) 122 (e.g., disposed on first object 92).

Processing unit 130 may receive image frames 124d, 124e and detect the shift of pixels 124f in image frames 124d, 124e. Processing unit 130 may further determine based on, for example, the shift of pixels 124f in image frames 124d, 124e the relative motion of second object 94 with respect to sensor(s) 122 (and thus with respect to first object 92). For example, processing unit 130 may determine the relative motion further based on, for example, know position of sensor(s) 122, known position of FOV 122a thereof, relative position of sensor(s) 122 and excitation unit 110, a resolution of sensor(s) 122, etc. Processing unit 130 may further quantify the relative motion of the second object 94 with respect to sensor(s) 122 (and thus with respect to first object 92) based on specified parameters of sensor(s) 122.

Figure 2A:
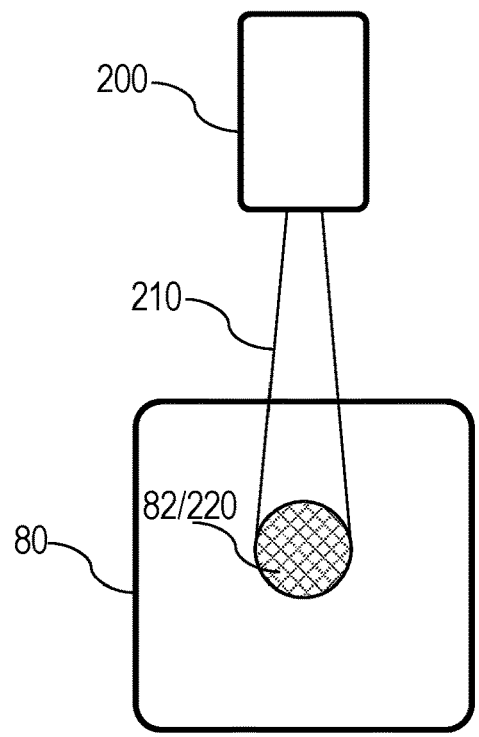
FIGS. 2A and 2B are schematic illustrations of an excitation unit for a system for determining a relative motion between two or more objects, according to some embodiments of the invention.
Figure 2B:
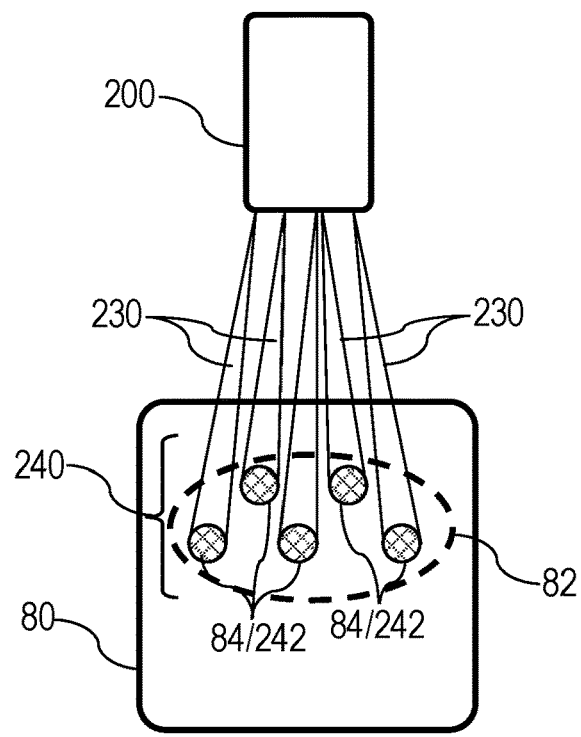

Reference is now made to FIGS. 2A and 2B, which are schematic illustrations of an excitation unit 200 for a system for determining a relative motion between two or more objects (such as system 100), according to some embodiments of the invention.

Excitation unit 200 may be, for example, excitation unit 110 in system 100 for determining a relative motion between two or more objects (e.g., as described above with respect to FIGS. 1A, 1B, 1C, 1D and 1E).

According to some embodiments, excitation unit 200 may illuminate at one portion 82 on an object 80 with at least one excitation beam 210 to thereby excite and induce at least one change at least in at least one portion 82 of object 80. For example, object 80, at least one portion 82 and the at least one change may be similar to second object 94, at least one portion 94a and at least one change 112, respectively, as described above with respect to FIGS. 1A, 1B, 1C, 1D and 1E.

In some embodiments, excitation unit 200 may illuminate portion 82 on object 80 with single excitation beam 210 to generate a single spot 220 on object 80 (e.g., as shown in FIG. 2A). Single spot 220 may, for example, induce change 112 within portion 82 on object 80 (e.g., as described above with respect to FIG. 1A).

In some embodiments, excitation unit 200 may illuminate multiple locations 84 in portion 82 on object 80 with corresponding multiple excitation beams 230 to generate a pattern 240 of multiple spots 242 within portion 82 on object 80 (e.g., as shown in FIG. 2B). In some embodiments, at least some of multiple spots 220 are at different depths below a surface of object 80. Pattern 240 of multiple spots 242 may, for example, induce pattern 114 of changes 112 within portion 82 on object 80 (e.g., as described above with respect to FIGS. 1B, 1C, 1D and 1E).

Figure 3:
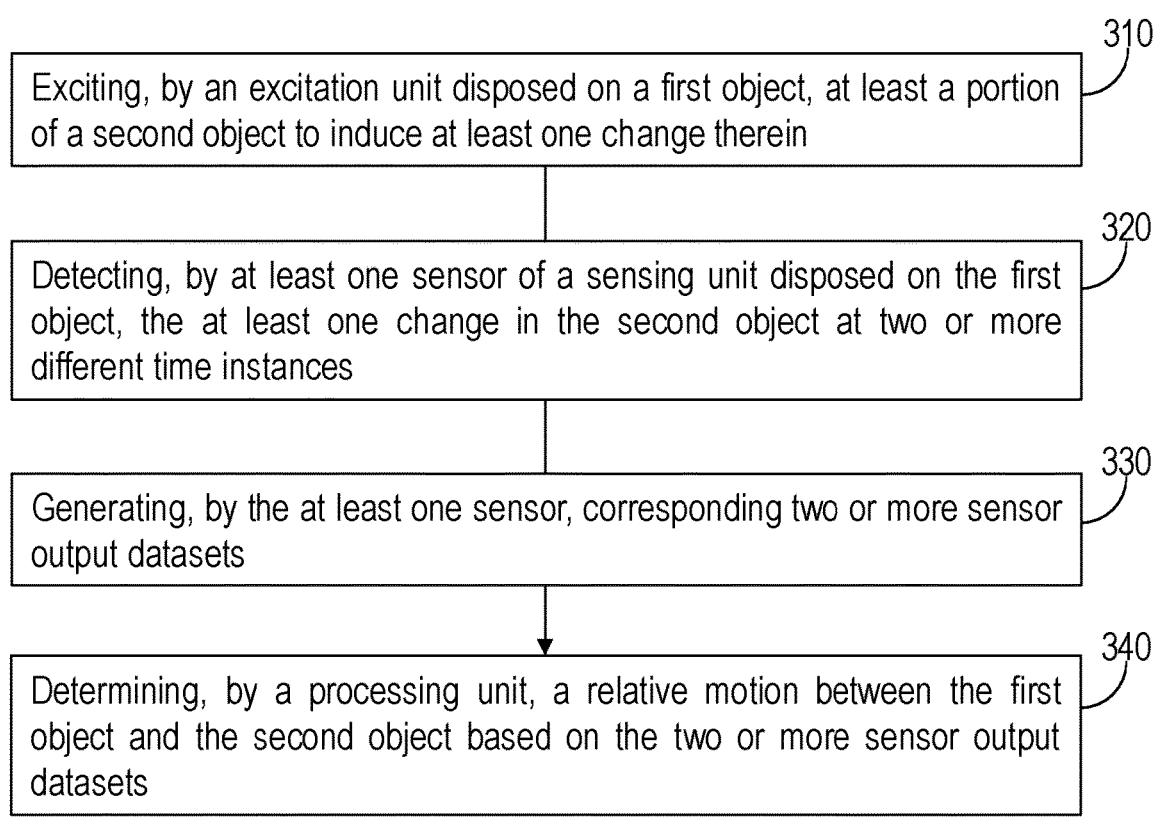
FIG. 3 is a flowchart of a method of determining a relative motion between two or more objects, according to some embodiments of the invention.

Reference is now made to FIG. 3, which is a flowchart of a method 300 of determining a relative motion between two or more objects, according to some embodiments of the invention.

Method 300 may be implemented by, for example, system 100, which may be configured to implement method 300. It is noted that method 300 is not limited to the flowcharts illustrated in FIG. 3 and to the corresponding description. For example, in various embodiments, method 300 needs not move through each illustrated box or stage, or in exactly the same order as illustrated and described.

According to some embodiments, method 300 may include exciting, by an excitation unit disposed on a first object, at least a portion of a second object to induce at least one change therein (stage 310). For example, excitation unit 110, sensing unit 120, first object 92, second object 94 and a portion 94a thereof, and at least one change 112 as described above with respect to FIGS. 1A, 1B, 1C, 1D and 1E.

In some embodiments, method 300 may include inducing, by the excitation unit, at least one of: a physical change, a chemical change or a combination thereof, in the second object (e.g., as described above with respect to FIGS. 1A and 1B).

In some embodiments, method 300 may include inducing, by the excitation unit, at least one temporal change in the second object such that the second body reverts to its initial state prior to the excitation after a period of time (e.g., as described above with respect to FIGS. 1A and 1B).

In some embodiments, method 300 may include determining, by the processing unit, a period of time after which a magnitude of the at least one temporal change reduces below a predefined threshold based on at least one of: a type of the at least one temporal change, one or more surface parameters of the second object and environmental conditions.

In some embodiments, method 300 may include setting, by the excitation unit, a magnitude of the excitation to adjust the period of time to a desired value.

In some embodiments, method 300 may include inducing, by the excitation unit, at least one pattern of changes, wherein the at least one pattern of changes comprises multiple spots, each of the multiple spots comprises the at least one change (e.g., as described above with respect to FIGS. 1B, 1C, 1D and 1E and FIG. 2B).

In some embodiments, method 300 may include encoding, by the excitation unit, a supplementary information into the at least one change (e.g., as described above with respect to FIGS. 1D and 1E).

In various embodiments, method 300 may include inducing, by the excitation unit, during at least one of excitation cycles, the at least one change that is different from the at least one change induced during other excitation cycles (e.g., as described above with respect to FIG. 1E).

In some embodiments, method 300 may include exciting, by the excitation unit, two or more different portions on the second object to induce corresponding two or more changes within the two or more portions thereof (e.g., as described above with respect to FIGS. 1A and 1B).

In various embodiments, method 300 may include simultaneously or subsequently exciting the two or more different portions thereof (e.g., as described above with respect to FIGS. 1A and 1B).

In some embodiments, method 300 may include exciting, by each of two or more excitation units, a different portion of corresponding two or more portions of the second object (e.g., as described above with respect to FIGS. 1A and 1B).

According to some embodiments, method 300 may include detecting, by at least one sensor of a sensing unit disposed on the first object, the at least one change in the second object at two or more different time instances (stage 320). For example, sensing unit 120 and sensor(s) 122 described above with respect to FIGS. 1A, 1B, 1C, 1D and 1E.

According to some embodiments, method 300 may include generating, by the at least one sensor, corresponding two or more sensor output datasets (stage 330). For example, sensor output datasets 124 described above with respect to FIGS. 1A, 1B, 1C, 1D and 1E.

According to some embodiments, method 300 may include determining, by a processing unit, a relative motion between the first object and the second object based on the two or more sensor output datasets (stage 340) (e.g., as described above with respect to FIGS. 1A and 1B). For example, processing unit 130 described above with respect to FIGS. 1A, 1B, 1C, 1D and 1E.

According to some embodiments, method 300 may include quantifying, by the processing unit, the relative motion between the first object and the second object based on the two or more sensor output datasets (e.g., as described above with respect to FIGS. 1A and 1B).

According to various embodiments, method 300 may include controlling, by the processing unit, the at least one sensor to follow the second object according to the determined and/or quantified relative motion between the first object and the second object such that a field-of-view (FOV) of the at least one sensor follows the excited portion with the induced at least one change.

According to some embodiments, method 300 may include measuring, by at least one distance sensor disposed on at least one of the first body and the second body, a distance between the first object and the second object.

In some embodiments, method 300 may include determining a real-world geographical location of the first object based on a real-world geographical location of the second object, the determined relative motion between the first object and the second object, the measured distance between the first object and the second object and a known real-world geographical location of the first object at some time instance during the tracking process (e.g., as described above with respect to FIGS. 1A and 1B).

In some other embodiments, method 300 may include determining a real-world geographical location of the second object based on a real-world geographical location of the first object, the determined relative motion between the first object, the second object and the measured distance between the first object and the second object and a known real-world geographical location of the second object at some time instance during the tracking process (e.g., as described above with respect to FIGS. 1A and 1B).

According to some embodiments, method 300 may include detecting, by the processing unit, based on at least one of the two or more sensor output datasets, an upcoming disappearance of the at least one change from a field-of-view (FOV) of the at least one sensor of the sensing unit (e.g., as described above with respect to FIGS. 1D and 1E).

In some embodiments, upon the detection of the upcoming disappearance of the at least one change from the FOV of the at least one sensor, method 300 may include exciting, by the excitation unit, at least a portion of the second object, before the at least one change disappears from the FOV of the at least one sensor (e.g., as described above with respect to FIGS. 1D and 1E).

In some embodiments, method 300 may include, upon the detection of the upcoming disappearance of the at least one change from the FOV of the at least one sensor, exciting, by the excitation unit, the same portion of second object that has been excited at a preceding excitation cycle (e.g., described above with respect to FIG. 1D).

In some embodiments, upon the detection of the upcoming disappearance of the at least one change from the FOV of the at least one sensor, method 300 may include exciting, by the excitation unit, a second portion on the second object such that the previously excited portion on the second object and the second portion thereof are both in the FOV of the at least one sensor during at least one time point (e.g., as described above with respect to FIG. 1E).

According to various embodiments, method 300 may include controlling the excitation unit by the processing unit to apply excitation cycles according to the determined and/or quantified relative motion between the first object and the second object, such that one or more of changes in the second object may be detectable by at least one sensor (e.g., may be in the FOV of the at least one sensor, etc.) at all times (e.g., as described above with respect to FIGS. 1D and 1E).

Figure 4:
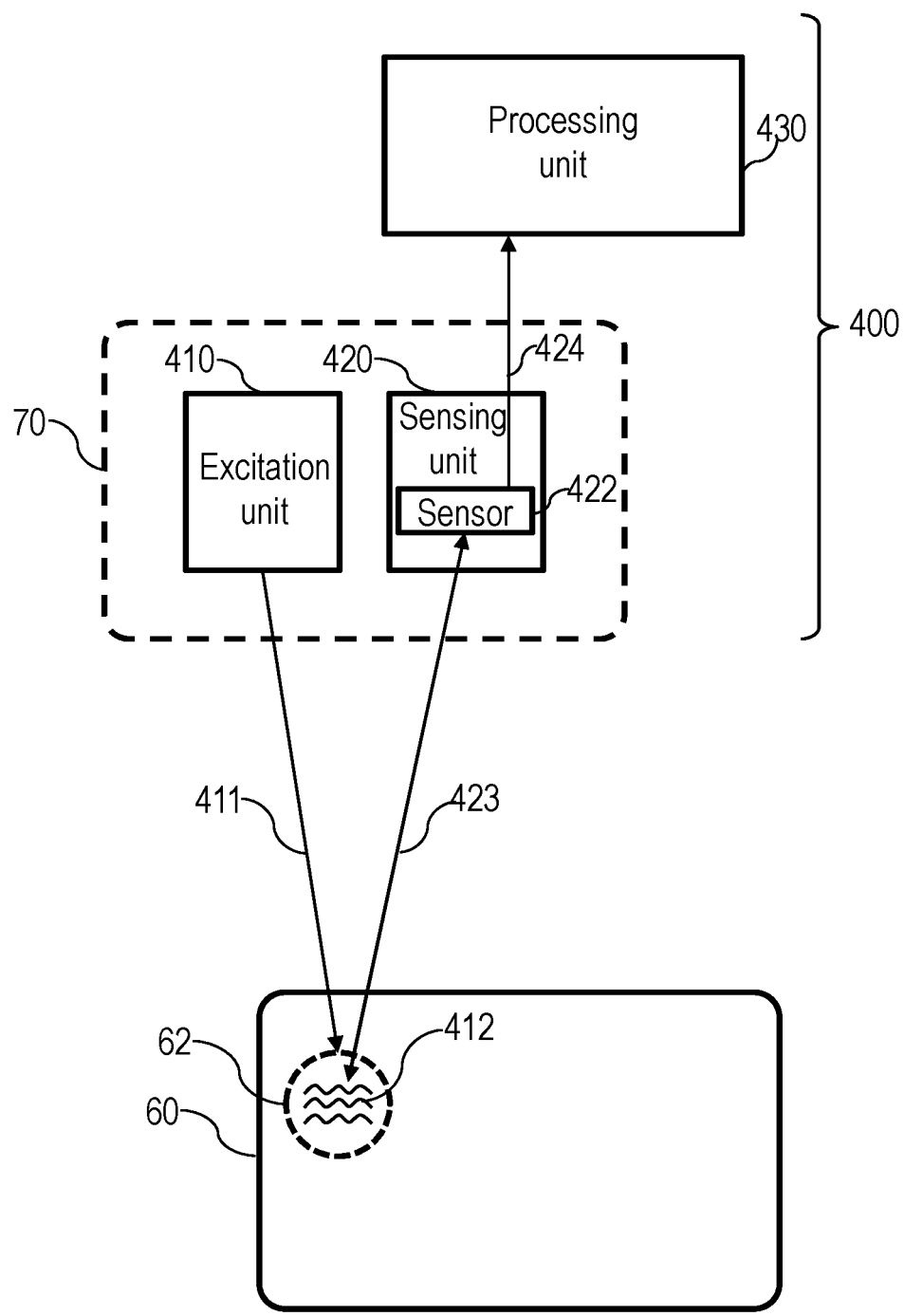
FIG. 4 is a schematic block diagram of a system for determining a relative motion of at least one object with respect to a specified location, according to some embodiments of the invention.

Reference is now made to FIG. 4, which is a schematic block diagram of a system 400 for determining a relative motion of at least one object 60 with respect to a specified location 70, according to some embodiments of the invention.

According to some embodiments, system 400 may include an excitation unit 410, a sensing unit 420 and a processing 430. For example, excitation unit 410 may be excitation unit 110 (e.g., described above with respect to FIGS. 1A, 1B, 1C, 1D and 1E) or excitation unit 200 (e.g., described above with respect to FIGS. 2A and 2B), sensing unit 420 may be sensing unit 120 (e.g., described above with respect to FIGS. 1A, 1B, 1C, 1D and 1E) and processing unit

430 may be processing unit 130 (e.g., described above with respect to FIGS. 1A, 1B, 1C, 1D and 1E).

System 400 may be disposed at a specified location 70, for example within a terrain, and may be configured to determine and/or quantify a relative motion of one or more objects 60 with respect to specified location 70.

According to some embodiments, excitation unit 410 may excite (e.g., as indicated by arrow 411 in FIG. 4) at least a portion 62 of object 60 to thereby induce at least one change 412 therein (e.g., described above with respect to FIGS. 1A, 1B, 1C, 1D and 1E). For example, change(s) 412 may be any of the physical change(s) or the chemical change(s) as described above with respect to FIGS. 1A, 1B, 1C, 1D and 1E.

According to some embodiments, sensing unit 420 may include at least one sensor 422 that may measure at least one change 412 in object 60 (e.g., as indicated by doubled arrow 423 in FIG. 4 and as described above with respect to FIGS. 1A and 1B). For example, sensor(s) 422 may be sensor(s) 122 described above with respect to FIGS. 1A, 1B, 1C, 1D and 1E.

According to some embodiments, sensor(s) 422 of sensing unit 420 may measure change(s) 412 in object 60 at two or more different time instances and generate corresponding two or more sensor output datasets 424 representing change(s) 412 thereof (e.g., as described above with respect to FIGS. 1A, 1B, 1C, 1D and 1E).

According to various embodiments, processing unit 430 may receive two or more sensor output dataset(s) 424 from sensing unit 420 and determine and/or quantify the relative motion of object 60 with respect to specified location 70 based on two or more sensor output datasets 424 (e.g., as described above with respect to FIGS. 1A, 1B, 1C, 1D and 1E).

Figure 5:
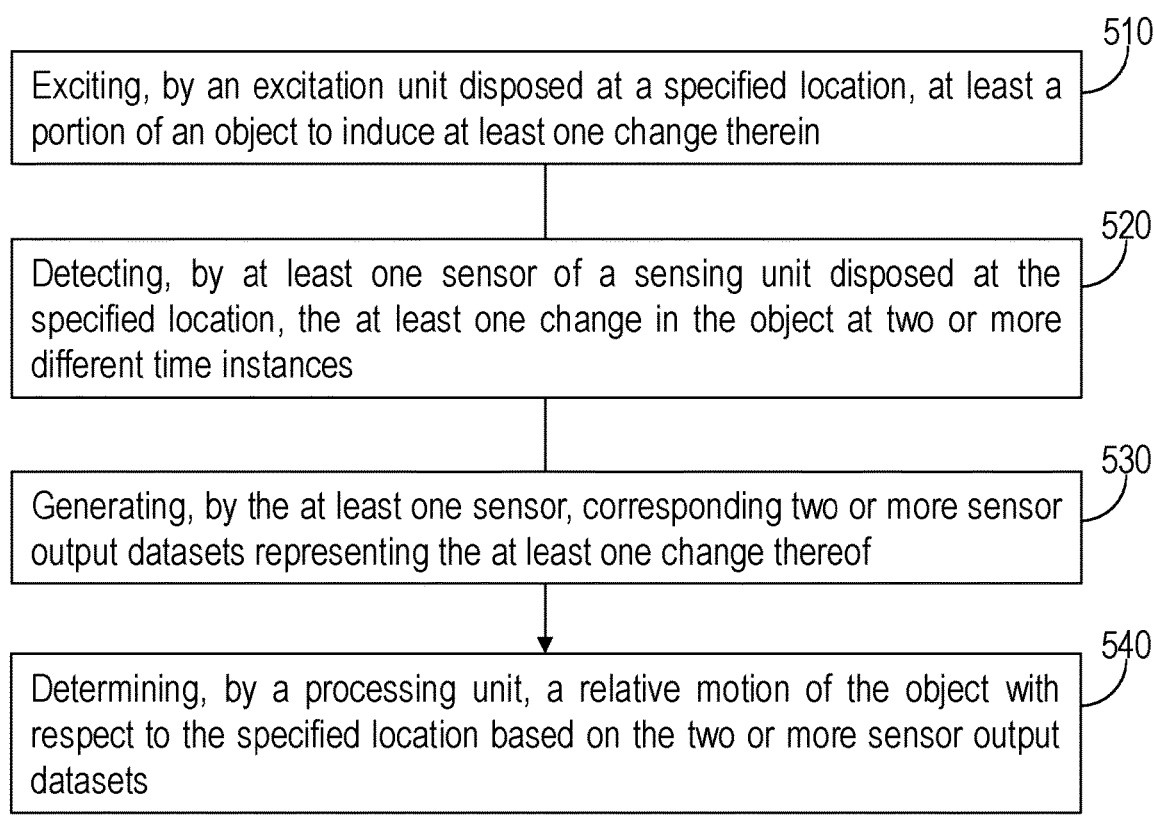
FIG. 5 is a flowchart of a method of determining a relative motion of at least one object with respect to a specified location, according to some embodiments of the invention.

Reference is now made to FIG. 5, which is a flowchart of a method 500 of determining a relative motion of at least one object with respect to a specified location, according to some embodiments of the invention.

Method 500 may be implemented by, for example, system 400, which may be configured to implement method 500. It is noted that method 500 is not limited to the flowcharts illustrated in FIG. 5 and to the corresponding description. For example, in various embodiments, method 500 needs not move through each illustrated box or stage, or in exactly the same order as illustrated and described.

According to some embodiments, method 500 may include exciting, by an excitation unit disposed at a specified location, at least a portion of an object to induce at least one change therein (stage 510) (e.g., as described above with respect to FIG. 4).

According to some embodiments, method 500 may include detecting, by at least one sensor of a sensing unit disposed at the specified location, the at least one change in the object at two or more different time instances (stage 520) (e.g., as described above with respect to FIG. 4).

According to some embodiments, method 500 may include generating, by the at least one sensor, corresponding two or more sensor output datasets representing the at least one change thereof (stage 530) (e.g., as described above with respect to FIG. 4).

According to some embodiments, method 500 may include determining, by a processing unit, a relative motion of the object with respect to the specified location based on the two or more sensor output datasets (stage 540) (e.g., as described above with respect to FIG. 4).

According to some embodiments, method 500 may include quantifying, by the processing unit, the relative motion of the object with respect to the specified location based on the two or more sensor output datasets (e.g., as described above with respect to FIG. 4).

Advantageously, the disclosed systems and methods may enable determination/measurement of the relative motion between two or more objects and/or between one or more objects and the specified location in the case when the objects lack any (or sufficient number of) visual markers and/or have uniform structure, without. Furthermore, the determination/measurement of the relative motion thereof may be performed without inducing long-term changes (such as, for example, permanent visual markers or continuous electromagnetic radiation).

Advantageously, the disclosed systems and methods may enable determination and/or quantification of the relative motion between two or more objects and/or between one or more objects and the specified location in the case when the objects lack any (or sufficient number of) visual markers and/or have uniform structure. Furthermore, the determination and/or quantification of the relative motion thereof may be performed, in some embodiments, without inducing long-term changes (such as, for example, permanent visual markers or continuous electromagnetic radiation) in the objects.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for determining a relative motion between two or more objects, the system comprising:
   an excitation unit adapted to be disposed on a first object, the excitation unit is configured to excite and to induce at least one change in at least a portion of a second object, wherein the at least one change is one of: a temporal physical change, a temporal chemical change or a combination thereof;
   a sensing unit adapted to be disposed on the first object, the sensing unit comprises a sensor configured to detect the at least one change in the second object at two or more different time instances and to generate corresponding two or more sensor output datasets;
   a processing unit in communication with the sensing unit, the processing unit is configured to determine a relative motion between the first object and the second object based on the two or more sensor output datasets, wherein the processing unit is a general purpose computer, special purpose computer, or other programmable data processing apparatus; and
   at least one distance sensor adapted to be disposed on at least one of the first object and the second object, the at least one distance sensor is configured to measure a distance between the first object and the second object, wherein the processing unit is configured to determine at least one of:
   a real-world geographical location of the first object based on a real-world geographical location of the second object, the determined relative motion between the first object and the second object, the measured distance between the first object and the second object and a known real-world geographical location of the first object at some time instance during the tracking process; and
   a real-world geographical location of the second object based on a real-world geographical location of the first object, the determined relative motion between the first object and the second object, the measured distance between the first object and the second object and a known real-world geographical location of the second object at some time instance during the tracking process.

2. The system of claim 1, wherein the processing unit is configured to quantify the relative motion between the first object and the second object based on the two or more sensor output datasets thereof.

3. The system of claim 1, wherein the at least one change is at least one of: a physical change, a chemical change or a combination thereof.

4. The system of claim 1, wherein the at least one change is temporal and wherein the second object reverts to its initial state prior to excitation after a period of time.

5. The system of claim 4, wherein the processing unit is configured to determine a period of time after which a magnitude of the at least one temporal change reduces below a predefined threshold based on at least one of: a type of the at least one temporal change, one or more surface parameters of the second object and environmental conditions.

6. The system of claim 5, wherein the excitation unit is configured to set a magnitude of the excitation to adjust the period of time to a desired value.

7. The system of claim 1, wherein the excitation unit is configured to induce at least one pattern of changes, wherein the at least one pattern of changes comprises multiple spots, each of the multiple spots comprises the at least one change.

8. The system of claim 1, wherein the processing unit is configured to detect, based on at least one of the two or more sensor output datasets, an upcoming disappearance of the at least one change from a field-of-view (FOV) of the sensor.

9. The system of claim 8, wherein the disappearance of the at least one change from the FOV of the sensor is due to at least one of: temporarily nature of the at least one change, relative motion between the first object and the second object and at least partial eclipse of the FOV by a third object.

10. The system of claim 9, wherein upon the detection of the upcoming disappearance of the at least one change from the FOV of the sensor, the processing unit is configured to control the excitation unit to excite at least a portion of the second object before the at least one change disappears from the FOV of the sensor.

11. The system of claim 9, wherein the processing unit is configured to control the excitation unit to excite at least one of:

the same portion of the second object that has been excited at a preceding excitation cycle; and a second portion of the second object such that previously excited portion of the second object and the second portion thereof are both in the FOV of the at least one sensor during at least one time point.

12. The system of claim 1, wherein the excitation unit is configured to induce, during at least one of excitation cycles, the at least one change that is different from the at least one change induced during other excitation cycles.

13. The system of claim 1, wherein the excitation unit is configured to encode a supplementary information in the at least one change.

14. A method of determining a relative motion between two or more objects, the method comprising:

exciting, by an excitation unit disposed on a first object, at least a portion of a second object to induce at least one change therein, wherein the at least one change is one of: a temporal physical change, a temporal chemical change or a combination thereof;

detecting, by a sensor of a sensing unit disposed on the first object, the at least one change in the second object at two or more different time instances;

generating, by the sensor, corresponding two or more sensor output datasets;

determining, by a processing unit, a relative motion between the first object and the second object based on the two or more sensor output datasets, and measuring a distance between the first object and the second object by at least one distance sensor disposed on at least one of the first object and the second object and, by a processing unit, determining at least one of:

a real-world geographical location of the first object based on a real-world geographical location of the second object, the determined relative motion between the first object and the second object, the measured distance between the first object and the second object and a known real-world geographical location of the first object at some time instance during the tracking process; and a real-world geographical location of the second object based on a real-world geographical location of the first object, the determined relative motion between the first object and the second object, the measured distance between the first object and the second object and a known real-world geographical location of the second object at some time instance during the tracking process.

15. The method of claim 14, further comprising quantifying, by the processing unit, the relative motion between the first object and the second object based on the two or more sensor output datasets thereof.

16. The method of claim 14, further comprising inducing, by the excitation unit, at least one temporal change in the second object such that the second body reverts to its initial state prior to excitation after a period of time.

17. The method of claim 16, further comprising determining, by the processing unit, a period of time after which a magnitude of the at least one temporal change reduces below a predefined threshold based on at least one of: a type of the at least one temporal change, one or more surface parameters of the second object and environmental conditions.

* * * * *